United States Patent
Zaina et al.

(10) Patent No.: US 11,556,330 B2
(45) Date of Patent: Jan. 17, 2023

(54) ANALYSIS AND IMPLEMENTATION OF SECURITY UPDATES

(71) Applicant: KYNDRYL, INC., New York, NY (US)

(72) Inventors: Fabio Zanforlin Zaina, Campinas (BR); Leonardo de Bem Ferreira, Campinas (BR); Silvana Galeazzi, Campinas (BR); Marco Antonio Milanez, Piracicaba (BR); Sergio Varga, Campinas (BR); Thiago Bianchi, Sao Carlos (BR)

(73) Assignee: KYNDRYL, INC., New York, NY (US)

( * ) Notice: Subject to any disclaimer, the term of this patent is extended or adjusted under 35 U.S.C. 154(b) by 51 days.

(21) Appl. No.: 17/102,695

(22) Filed: Nov. 24, 2020

(65) Prior Publication Data
US 2022/0164645 A1   May 26, 2022

(51) Int. Cl.
*G06F 8/65* (2018.01)
*G06N 3/08* (2006.01)
(Continued)

(52) U.S. Cl.
CPC .............. *G06F 8/65* (2013.01); *G06F 16/245* (2019.01); *G06F 21/57* (2013.01); *G06N 3/0445* (2013.01);
(Continued)

(58) Field of Classification Search
CPC .. G06F 8/60–66; G06F 16/245; G06F 21/577; G06F 2221/033; G06N 3/02;
(Continued)

(56) References Cited

U.S. PATENT DOCUMENTS

| | | |
|---|---|---|
| 5,790,856 A | 8/1998 | Lillich |
| 5,809,287 A | 9/1998 | Stupek, Jr. |

(Continued)

FOREIGN PATENT DOCUMENTS

| | | |
|---|---|---|
| JP | 2006331045 A | 12/2006 |
| JP | 2017529628 A | 10/2017 |
| TW | 505189 B | 10/2015 |

OTHER PUBLICATIONS

Bleikertz, Sören, et al., Security Audits of Multi-tier Virtual Infrastructures in Public Infrastructure Clouds, CCSW'10: Proceedings of the 2010 ACM workshop on Cloud computing security workshop, Oct. 2010, pp. 93-102, [retrieved on Oct. 3, 2022], Retrieved from the Internet: <URL:http://dl.acm.org/>.*

(Continued)

*Primary Examiner* — Geoffrey R St Leger
(74) *Attorney, Agent, or Firm* — John Kennel; Andrew M. Calderon; Calderon Safran & Cole P.C.

(57) ABSTRACT

A method and a system for automating security updates in a multi-tiered architecture of a system environment. The method includes receiving a software update note relating to a multi-tiered architecture system environment and determining a patch in the software update note is initially compatible with the system environment. The method also includes predicting, by a patch acceptance machine learning model, the patch is patchable within the system environment and predicting, by an installation machine learning model, an installation patch time for the patch on the system environment. The method also includes installing the patch at the installation patch time on the system environment, and validating the patch installation using a validation machine learning model.

19 Claims, 7 Drawing Sheets

(51) Int. Cl.
*G06F 16/245* (2019.01)
*G06N 3/04* (2006.01)
*G06F 21/57* (2013.01)
*G06N 20/10* (2019.01)

(52) U.S. Cl.
CPC .............. *G06N 3/08* (2013.01); *G06N 20/10* (2019.01); *G06F 21/577* (2013.01); *G06F 2221/033* (2013.01)

(58) Field of Classification Search
CPC ........... G06N 3/0445; G06N 3/08–088; G06N 20/00; G06N 20/10; G06N 20/20
USPC ................................................. 717/168–178
See application file for complete search history.

(56) References Cited

U.S. PATENT DOCUMENTS

| | | | |
|---|---|---|---|
| 5,960,189 | A | 9/1999 | Stupek, Jr. |
| 7,424,706 | B2 | 9/2008 | Ivanov |
| 7,840,946 | B2 | 11/2010 | Gupta |
| 8,225,303 | B2 | 7/2012 | Wagner |
| 8,839,221 | B2 | 9/2014 | Sapuntzakis |
| 9,146,727 | B2 | 9/2015 | Arcese |
| 9,274,784 | B2 | 3/2016 | Wang |
| 9,715,378 | B2 | 7/2017 | Dickerson |
| 9,804,901 | B2 | 10/2017 | Gambardella |
| 10,318,274 | B1 | 6/2019 | Feeser |
| 10,394,550 | B2 | 8/2019 | Islam et al. |
| 2006/0069796 | A1 | 3/2006 | Lucas |
| 2006/0080656 | A1 | 4/2006 | Cain |
| 2009/0187899 | A1* | 7/2009 | Mani .......................... G06F 8/65 717/168 |
| 2013/0346329 | A1 | 12/2013 | Alib-Bulatao |
| 2015/0178063 | A1 | 6/2015 | Narkinsky |
| 2015/0227268 | A1 | 8/2015 | Rathod |
| 2015/0324184 | A1 | 11/2015 | Foley |
| 2016/0154962 | A1 | 6/2016 | Nuñez Di Croce |
| 2018/0081669 | A1* | 3/2018 | Becker ................ H04L 63/0884 |
| 2018/0285086 | A1 | 10/2018 | O'Malley |
| 2019/0187972 | A1* | 6/2019 | Hirose .................. H04L 67/325 |
| 2020/0394310 | A1* | 12/2020 | Sloane ...................... G06F 8/65 |
| 2021/0157562 | A1* | 5/2021 | Sethi ........................ G06N 5/04 |
| 2021/0334195 | A1* | 10/2021 | Sethi ..................... G06F 9/4411 |
| 2022/0116470 | A1* | 4/2022 | Sethi ...................... H04L 67/55 |

OTHER PUBLICATIONS

Mathew, George, et al., Securing Multi-Tiered Web Applications, 2010 IEEE International Conference on Wireless Communications, Networking and Information Security, Jun. 25-27, 2010, pp. 505-509, [retrieved on Oct. 3, 2022], Retrieved from the Internet: <URL:http://ieeexplore.ieee.org/>.*
"A Method to Manage Patches on Multiple Computer System," IP.com No. IPCOM000259485D, IP.com Electronic Publication Date: Aug. 15, 2019, https://priorart.ip.com/IPCOM/000259485.
Follis, Earl, "Introduction to automated enterprise patch management software," https://searchsecurity.techtarget.com/feature/Introduction-to-automated-patch-management-products-in-the-enterprise, 4 pages, printed Nov. 23, 2020, published Jun. 2017.
Palani, Prakash, "SAP Security Patch Implementation: Helps you to analyze and define a robust strategy for implementing SAP Security Patches," http://basisondemand.com/Documents/Whitepaper_SAP_Security_Patch_Implementation.pdf, Downloaded Jul. 17, 2020, 11 pages.
Anonymous, "Common Vulnerability Scoring System SIG", https://www.first.org/cvss/, accessed Jun. 16, 2022, 2 pages.
Anonymous, "Multitier architecture", https://en.wikipedia.org/wiki/Multitier_architecture, accessed Jun. 16, 2022, 5 pages.

* cited by examiner

ANALYSIS AND IMPLEMENTATION OF SECURITY UPDATES

BACKGROUND

The present disclosure relates to multi-tiered architecture system environments, and more specifically, to validating patch security updates on a multi-tiered architecture system environment.

Multi-tier architecture refers to a client-server architecture in which presentation, application processing, and data management functions are separated. Typically, a three-tier architecture approach is used in which a client-server software architecture pattern includes components such as a user interface, functional process logic, and computer data storage and access. These components can be developed and maintained independently.

Enterprise software solution systems (e.g., SAP®, a trademark product of SAP America, Inc. offering software, services, and applications) operating on a multi-tier architecture periodically transmit security update notes to customers. These notes contain information regarding operational advice, action items, and available patches that secure the system from possible security vulnerabilities. Customers can apply the patches referenced in the security update notes to protect against potential exploits and to ensure a secure configuration of their system.

SUMMARY

Embodiments of the present disclosure include a computer-implemented method of training machine learning models for automating security updates in a multi-tiered architecture system environment. The computer-implemented method includes retrieving historical patches relating to a system environment and extracting descriptive data from the historical patches. The descriptive data includes unstructured data fields and structured data fields. The computer-implemented method also includes extracting installation information from each patch in the historical patches. The installation information includes a date of installation and a time of installation. The computer-implemented method further includes determining an installation duration for each patch in the historical patches and generating training samples from the installation information and the installation duration. The computer-implemented method also includes assembling training datasets from the training samples for a patch acceptance machine learning model and an installation machine learning model and training the patch acceptance machine learning model and the installation machine learning model using the training datasets. The computer-implemented method also includes retrieving log files relating to the system environment. The log files include historical implementation log files, historical error log files, and short dump files. The computer-implemented method includes retrieving historical system operation characteristics from the system environment, computing error rates from the historical implementation log files and the historical system error log files, and computing dump rates from the historical short dump log files. The computer-implemented method further includes extracting additional characteristics from the historical system operation characteristics, generating additional training samples from the error rates, the dump rates, and the additional characteristics, and assembling an additional training dataset from the additional training samples. The computer-implemented method also includes training a validation machine learning model, wherein the validation machine learning model is trained to validate patch installations performed on the system environment.

Additional embodiments of the present disclosure include a computer-implemented method of automating security updates in a multi-tiered architecture system environment. The computer-implemented method includes receiving a software update note relating to a multi-tiered architecture system environment, and determining a patch in the software update note is initially compatible with the system environment. The computer-implemented method also includes predicting, by a patch acceptance machine learning model, the patch is patchable within in the system environment and predicting, by an installation machine learning model, an installation patch time for the patch on the system environment. The computer-implemented method also includes installing the patch at the installation patch time on the system environment and validating the patch installation using a validation machine learning model.

Further embodiments are directed to a system for automating security updates in a multi-tiered architecture system environment and configured to perform the methods described above. The present summary is not intended to illustrate each aspect of every implementation of and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
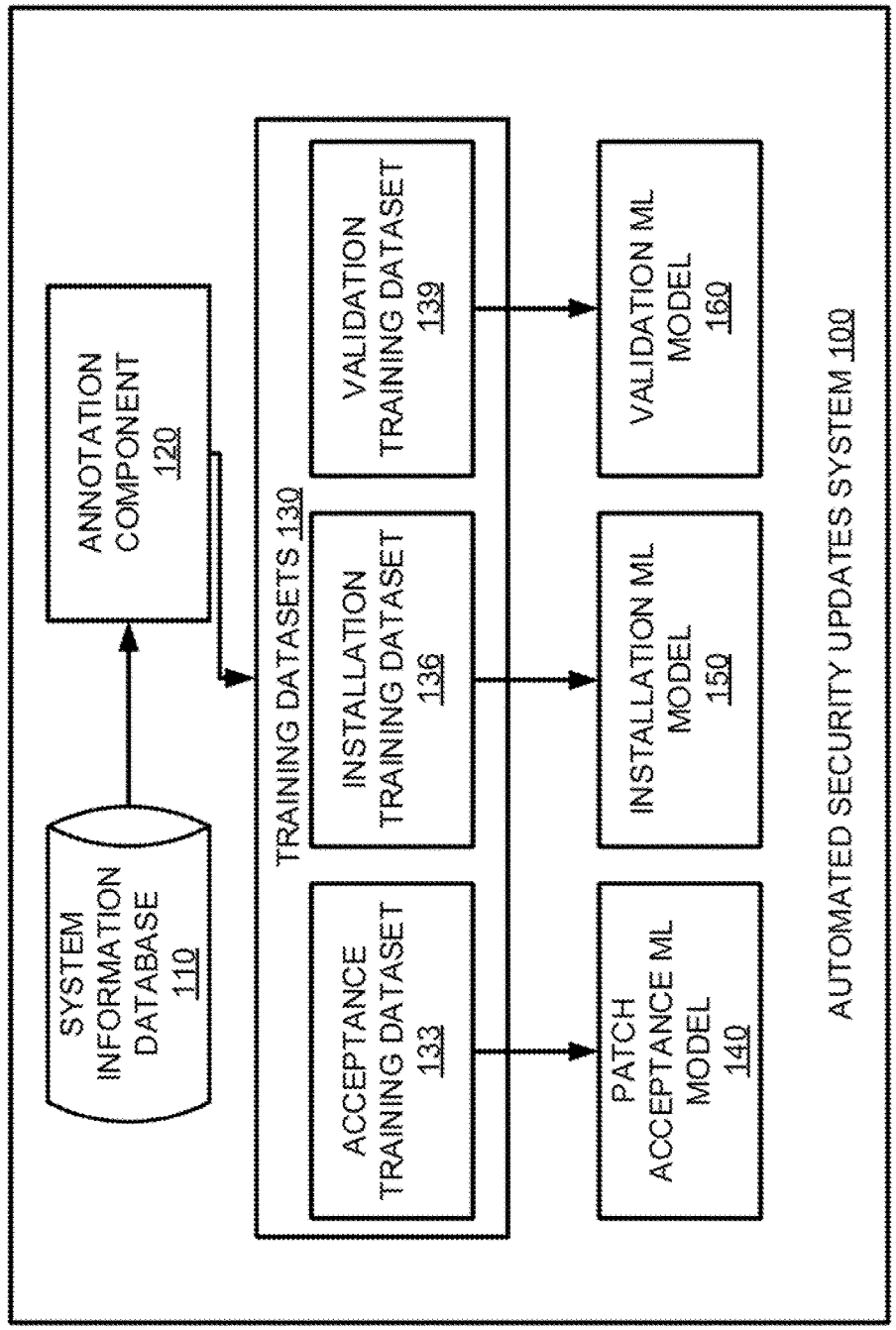
FIG. 1 is a block diagram illustrating an automated security updates system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to multi-tiered architecture system environments, and more specifically, to automating and validating patch updates on a multi-tiered architecture system environment. While the present disclosure is not necessarily limited to such applications, various aspects of the disclosure may be appreciated through a discussion of various examples using this context.

Enterprise software solution systems implement a multi-tiered architecture to combine business applications of an enterprise into a single solution. Each business application can be seen as a component with modules providing specific functionality within a component. The components can include, for example, enterprise resource planning, customer relationship management, supply chain management, supplier relationship management, and product lifecycle management. By combining multiple business applications, cross-application business processes become simpler to manage while also providing transparency and consistency between applications.

Additionally, a module can have a discrete function within a component that addresses a specific business function. Individually, each module is used to manage a business area or functional area for which a particular department may be responsible. For example, the shipping department of a company may run a business transaction in a material management module that checks inventories of a particular warehouse.

A client can be seen as a self-contained business entity operating an enterprise software solution system component. A client can log into the system to run business transactions, perform services, check inventory, and the like. Larger corporations may have multiple clients for each component for the various business units with a corporation.

Limitations on maintaining enterprise software remain, however, as patching security updates to a multi-tiered architecture system environment can adversely affect a client's system. Clients updating their specific implementation of the software solution must factor in possible changes to the various components and modules. These changes include, for example, kernel updates at an operating system level, application fixes, and additional code, changes in design structure at the application level or database level, as well as possible changes that can affect the presentation layer.

Additionally, updates may take a considerable amount of time to complete, which may involve downtime of the software. The factors relating to the amount of time required to update the software include, for example, the severity of a vulnerability, number of updates, type of system, size of the patch, and the like. For example, the security updates can include severity scores of the vulnerabilities the updates address. These severity scores can be in accordance with the common vulnerability scoring system and can assist clients in prioritizing patches. The vulnerabilities with a high severity score may require almost immediate action, which can result in the downtime of the system.

Embodiments of the present disclosure may overcome the above and other problems by using an automated security updates system. The automated security update system can leverage machine learning techniques to analyze and accept security patches, establish an installation calendar for the acceptable patches, and validate installed patches on a system environment. The automated security updates system can include three separate machine learning models specifically trained to output each functionality, respectively.

Embodiments of the automated security updates system includes a patch acceptance machine learning model configured to output patch compatibility between a patch and a system environment. The patch acceptance machine learning model can be specifically trained using historical patch information stored by the system environment. For example, descriptive data from the historical patch information can be extracted which may include unstructured data fields and structured data fields. From this data, a training dataset can be derived to optimally train the patch acceptance machine learning model specifically for the system environment.

Embodiments of the automated security update system includes an installation machine learning model configured to predict an installation time for a security patch on a system environment. The installation machine learning model can also be specifically trained using historical patch information stored by the system environment. For example, descriptive data from the historical patch information can be extracted that includes previous installation times of prior patches. From this data, a training dataset can be derived to optimally train the installation machine learning model specifically for the system environment.

In some embodiments, the installation machine learning model and the patch acceptance machine learning model are support-vector machines (SVMs) trained using supervised learning techniques. Given a set of training samples, an SVM training algorithm builds a machine learning model that can assign new samples to one category or another, making it a non-probabilistic binary linear classifier. In some embodiments, the installation machine learning model and the patch acceptance machine learning model are multi-layer perceptron neural networks. Multi-layer perceptron neural networks are considered feed-forward networks where the flow of information begins in the first layer, proceeds in the same direction to a hidden layer, and ends at an output layer. Except for the input nodes, each node may be a neuron that uses a nonlinear activation function.

In some embodiments, the validation machine learning model is a long short term memory (LSTM) neural network. The automated security updates system can employ the validation machine learning model as a regression LSTM neural network that represents the system running in an acceptable behavior and be characterized by a time series dataset. Additionally, optimal hyper parameterizations can be obtained that increase the evaluation metrics of the model. For example, these evaluation metrics include accuracy, F1-score, precision, recall, and the like.

Referring now to FIG. 1, shown is a high-level block diagram of an automated security updates system 100 for automating security updates in a multi-tier architecture system environment. The automated security updates system 100 includes a system information database 110, an annotation component 120, training datasets 130, a patch acceptance machine learning model 140, an installation machine learning model 150, and a validation machine learning model 160. The training datasets 130 include a patch acceptance training dataset 133, an installation training dataset 136, and a validation training dataset 139.

The system information database 110 is a component of the automated security updates system 100 configured to store historical patch information, log files, and historical system operation characteristics relating to a system environment. The historical patch information can include a list of installed patches performed on the system environment as well as the patches that attempted installation and were aborted.

The historical patch information can include various pieces of information relating to each patch installed or aborted. For example, the historical patch information can include, for each patch, a title summarizing the patch content, a symptom describing a system behavior if the patch is not applied, a reason and prerequisites providing a detailed description about the patch content and the system environment prerequisites required to install the patch, and a solution providing details on how the patch resolves a system environment problem.

Additionally, the historical patch information can include, for each patch, a product name, version, and support providing information about which system environment version should install the patch, a priority providing information referring to an urgency based on the Common Vulnerability Scoring System (CVSS), a CVSS score (a CVSS score can vary from 0.0 to 10.0 and is considered an industry standard for assessing the severity of computer system security vulnerabilities that attempts to assign severity scores to vulnerabilities), a component name providing information referring to a transaction relating to the patch, and required downtime. The required downtime relates to an estimation of required downtime a system environment may encounter when installing a patch. For example, a patch may require a system environment to be stopped to properly install the patch, and the required downtime reflects that needed time.

The log files are files that record events that occur in the system environment or other software operating running on the system environment. The log files can include historical implementation log files, historical error log files, and short dump log files from a system environment. The historical implementation log files can include patch implementation information, including information on prior patching decisions, the basis for those decisions, system environment configuration related to the patch, and installation timing. The historical error log files include error information for each patch. For example, the error information can include, but is not limited to, system environment configuration, point of failure, time of failure, error codes, required administrative rights, unauthorized resources, and the like. The short dump log files are log files that record errors generated during runtime of any program triggered by a transaction or extraction. For example, if a patch or program crashes, a short dump log file is created detailing information regarding the crash.

The historical system operation characteristics are historical system operation parameters of a system environment related to each installed patch that resulted in a successful installation. These system operation parameters include, but are not limited to, response time, requisition, queue size, table lock, and updated time.

The annotation component 120 is a component of the automated security updates system 100 configured to annotate and generate training samples from information stored by system information database 110. The information stored by the system information database 110 can be seen as a corpus, where the corpus is a collection of machine-readable texts that have been produced in a natural communicative setting. Subsets of the information can be selected for specific training purposes, and once selected, the annotation component 120 can convert the subset of the information into a training dataset 130. For example, the subset of log files, including with time of installation information, can be used to generate a training dataset 130 for the installation machine learning model 150. In some embodiments, the historical patches that were aborted by the system environment can also be represented in a sample by replacing the possible values of the day, the week, and the installation period as a zero.

In some embodiments, the annotation component 120 retrieves structured data such as the day of the week and the period of installation from the historical patches stored by the system information database 110. For example, the annotation component 120 can generate samples for the installation machine learning model 136 that include the day of the week patches were installed on the system environment (e.g., Sunday, Monday, Tuesday, etc.). Additionally, the samples can also include the period the installation occurred (e.g., morning, afternoon, evening, etc.) The annotation component 120 can also analyze the start and end timestamps of the installation process of each historical patch and compute the actual installation time for the patch. These samples can include but are not limited to the day of the week, the period of installation, and the actual installation time as features of a sample generated from each historical patch.

The annotation component 120 is further configured to apply natural language processing (NLP) techniques to textual fields found in the information stored by the system information database 110. The annotation component 120 can employ NLP techniques to remove insignificant words from the unstructured textual fields. In some embodiments, the annotation component 120 employs a bag-of-words process to obtain a vector representation of the unstructured textual information found in the stored information.

The annotation component 120 is further configured to employ dimension reduction techniques to textual fields of the historical patches. For example, the annotation component 120 can apply a dimension reduction technique of the space formed by a bag-of-words vector. By employing dimension reduction techniques, the vector representation, along with the structured data, can be used as training samples for the patch acceptance machine learning model 140 and the installation machine learning model 150.

In some embodiments, the annotation component 120 employs a Principal Component Analysis (PCA) as a dimension reduction technique. PCA can be used as a dimension reduction technique by projecting each data point onto only the first few principal components to obtain lower-dimensional data while preserving as much of the data variation as possible. The first principal component can equivalently be defined as a direction that maximizes the variance of the projected data.

In some embodiments, the annotation component 120 employs a Latent Semantic Analysis (LSA) as a dimension reduction technique. LSA analyzes relationships between a set of documents (e.g., historical patches) and the terms they contain by producing a set of concepts related to the documents and terms. LSA assumes that words that are close in meaning will occur in similar pieces of text. A matrix containing word counts per document is constructed from a large piece of text, and singular value decomposition is used to reduce the number of rows while preserving the similarity structure along the columns. Documents are then compared by taking the cosine of the angle between the two vectors formed by any two columns. Values close to one can represent similar documents, while values close to zero can represent dissimilar documents.

The annotation component 120 is further configured to generate the training datasets 130 for the patch acceptance machine learning model 140 and the installation machine learning model 150 from the samples generated from the historical patches. The annotation component 120 can assemble the training datasets 130 from the samples produced from the historical patches that were both installed or aborted.

The annotation component 120 is further configured to compute error rates from the log files stored in the system information database 110. The annotation component 120 can compute error rates (e.g., per hour, minute, second) from the historical implementation log files. The error rates can be calculated by analyzing the timestamp values characterizing a successful installation of each historical patch retrieved and stored in the system information database 110. In some embodiments, the error rates are computed in the form of a regular expression to find occurrences of the keyword "error" and/or return codes indicating errors. For example, the annotation component 120 can analyze the historical implementation log files and count the log files containing the keyword "error," and compute the error rate based on that count in relation to the total number of historical implementation log files.

In some embodiments, the annotation component 120 computes error rates from the historical system error log files relating to a system environment. The annotation component 120 can compute the error rates (e.g., per hour, minute, second) from the historical system error log files. The error rates can be calculated by analyzing the timestamp values characterizing a successful installation of each historical patch retrieved and stored in the system information database 110. In some embodiments, the error rates are computed in the form of a regular expression to find occurrences of the keyword "error". For example, the annotation component 120 can analyze the historical system error log files and count the log files containing the keyword "error," and compute the error rate based on that count in relation to the total number of historical system error log files.

In some embodiments, the annotation component 120 computes dump rates from the historical short dump log files relating to a system environment. The annotation component 120 can compute the dump rates (e.g., per hour, minute, second) from the historical short dump log files. The dump rates can be calculated by analyzing the timestamp values characterizing a successful installation of each historical patch retrieved and stored in the system information database 110. In some embodiments, the dump rates are computed in the form of a regular expression to find occurrences of the keyword "error". For example, the annotation component 120 can analyze the historical short dump log files and count the log files containing the keyword "error," and compute the error rate based on that count in relation to the total number of historical short dump log files.

The annotation component 120 is further configured to compute a response time rate, a requisition queue size rate, a table lock average time rate, and an average update time from the historical system operation characteristics relating to a system environment. Similar to the error rates, the annotation component 120 can compute the response time rate, the requisition queue size rate, the table lock average time rate, and the average update time by analyzing the historical system operation characteristics and applying the timestamp value characterizing a successful installation of each historical patch.

The annotation component 120 is further configured to generate the validation training dataset 139 for the validation machine learning model 160. The validation training dataset 139 can represent the system environment running in an acceptable behavior and can be characterized as a time series The annotation component 120 can assemble the validation training dataset 139 by producing a dataset of samples that can include, but are not limited to, the error rates, the dump rates, the response time rates, the requisition queue size rates, the table lock average time rates, and the update average times.

The patch acceptance machine learning model 140 is a component of the automated security updates system 100 configured to predict whether installing a patch on a system environment will be accepted by the system environment. A patch converted into a test sample can be analyzed by the patch acceptance machine learning model 140, which output the day of the week and the period of implementation indicating an acceptable patch. The patch acceptance machine learning model 140 can also output a zero indicating a rejection of the patch.

The installation machine learning model 150 is a component of the automated security updates system 100 configured to predict a time period to install a patch onto a system environment. A patch converted into a test sample can be analyzed by the installation machine learning model 150, which can output the time necessary to install and implement the patch.

The validation machine learning model 160 is a component of the automated security updates system 100 configured to predict whether a patch installation of a patch is validated on a system environment.

The patch acceptance machine learning model 140, the installation machine learning model 150, and the validation machine learning model 160 can employ various machine learning techniques in making their predictions. Machine learning techniques can comprise algorithms or models that are generated by performing supervised, unsupervised, or semi-supervised training on a dataset and subsequently applying the generated algorithm or model to generate a corresponding output based on the machine learning model. For example, the patch acceptance machine learning model can output the day of the week and the period of implementation, indicating an acceptable patch. Machine learning algorithms can include but are not limited to decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF) hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an automated security updates system 100. In some embodiments, however, individual components may have greater or lesser complexity than as represented in FIG. 1, components other than or in addition to as shown in FIG. 1 may be present, and the number, type, and configuration of such components may vary.

Figure 2:
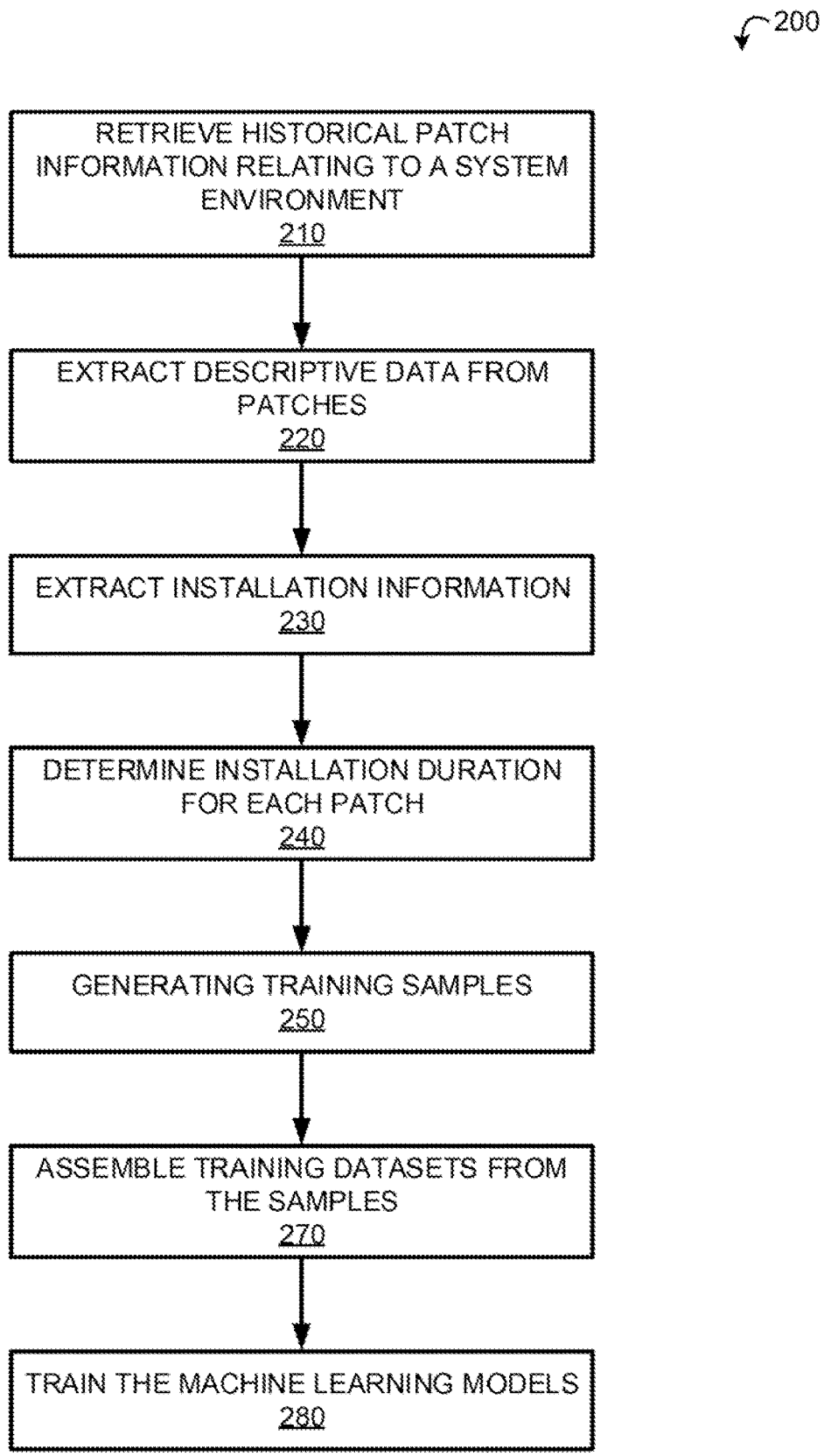
FIG. 2 is a flow diagram illustrating a process of training a patch acceptance machine learning model and an installation machine learning model, in accordance with embodiments of the present disclosure.

FIG. 2 is a flow diagram illustrating a process 200 of training the patch acceptance machine learning model 140 and the installation machine learning model 150, consistent with some embodiments. The process 200 may be performed by hardware, firmware, software executing on a processor, or a combination thereof. For example, any or all the steps of the process 200 may be performed by one or more processors embedded in a computing device.

The automated security updates system 100 retrieves historical patch information relating to a system environment and stores the information on the system information database 110. This is illustrated at step 210. The system environment can be a multi-tier architecture system environment (e.g., SAP SE enterprise software). The historical patch information can include a list of installed patches performed on the system environment as well as the patches that attempted installation and were aborted. For example, the historical patch information can include, for each patch, a title summarizing the patch content, a symptom describing a system behavior if the patch is not applied, a reason and prerequisites providing a detailed description about the patch content and the system environment prerequisites required to install the patch, and a solution providing details on how the patch resolves a system environment problem.

The annotation component 120 extracts descriptive data from the historical patch information. This is illustrated at step 220. The descriptive data can include unstructured textual fields (e.g., title, symptom, reason and prerequisites, solution, etc.) and structured data (e.g., product name, version and support package, priority, CVSS score, component name, the downtime required, etc.) In some embodiments, the annotation component 120 extracts the descriptive data through an application of a regular expression. For example, keywords such as "restart" and "shutdown" can be searched to determine installation times.

The annotation component 120 extracts installation information from the historical patch information. This is illustrated at step 230. The annotation component 120 can extract installation information that can include the day of the week patches were installed on the system environment (e.g., Sunday, Monday, Tuesday, etc.). Additionally, the installation information can also include the period the installation occurred (e.g., morning, afternoon, evening, etc.).

The annotation component 120 determines an installation duration of each historical patch in the historical patch information. This is illustrated at step 240. The annotation component 120 can also analyze the start and end timestamps of the installation process of each historical patch and compute the actual installation time for the patch. For example, a starting timestamp of a historical patch can indicate a start time at 9:00 AM on a Saturday and end timestamp of 8:00 AM on the following Sunday. The annotation component 120 can analyze the two timestamp and determine the historical patch had an installation duration of 23 hours.

The annotation component 120 generates training samples for the patch acceptance machine learning model 140 and the installation machine learning model 150. This is illustrated at step 250. The annotation component 120 can generate samples for the installation machine learning model 136 that include the day of the week patches were installed on the system environment. Additionally, the samples can also include the period the installation occurred (e.g., morning, afternoon, evening, etc.) The annotation component 120 can also analyze the start and end timestamps of the installation process of each historical patch and compute the actual installation time for the patch. These samples can include but are not limited to the day of the week, the period of installation, and the actual installation time as features of a sample generated from each historical patch.

Additionally, the annotation component 120 can apply a dimension reduction technique of the space formed by a bag-of-words vector. By employing dimension reduction techniques, the vector representation, along with the structured data, can be used as training samples for the patch acceptance machine learning model 140 and the installation machine learning model 150.

The annotation component 120 assembles training datasets 130 from the generated training samples. This is illustrated at step 260. The annotation component 120 can divide the training samples according to the function of the machine learning models. For example, the patch acceptance training dataset 133 can include samples including features such as patch installation times, successful patch installation information, patch information such as the product name, version, and a component name, as well system environment configuration. The installation training dataset 136 can include the day of the week and period of installed historical patches, time to install the patches, and the like.

The samples generated are specific to each machine learning model and trained by their respective training datasets 130. This is illustrated at step 280. The patch acceptance machine learning mode 140 is trained using the patch acceptance training dataset 133, and the installation machine learning model 150 is trained using the installation training dataset 136. In some embodiments, the patch acceptance machine learning model 140 and the installation machine learning model 150 are trained using supervised machine learning techniques. For example, the machine learning techniques include, but are not limited to, naives bayes, support vector machines, and multi-layer perceptron. In some embodiments, the input and output variables relating to the machine learning models are discrete and countable or can be converted into discrete and countable variables during the training process.

Figure 3:
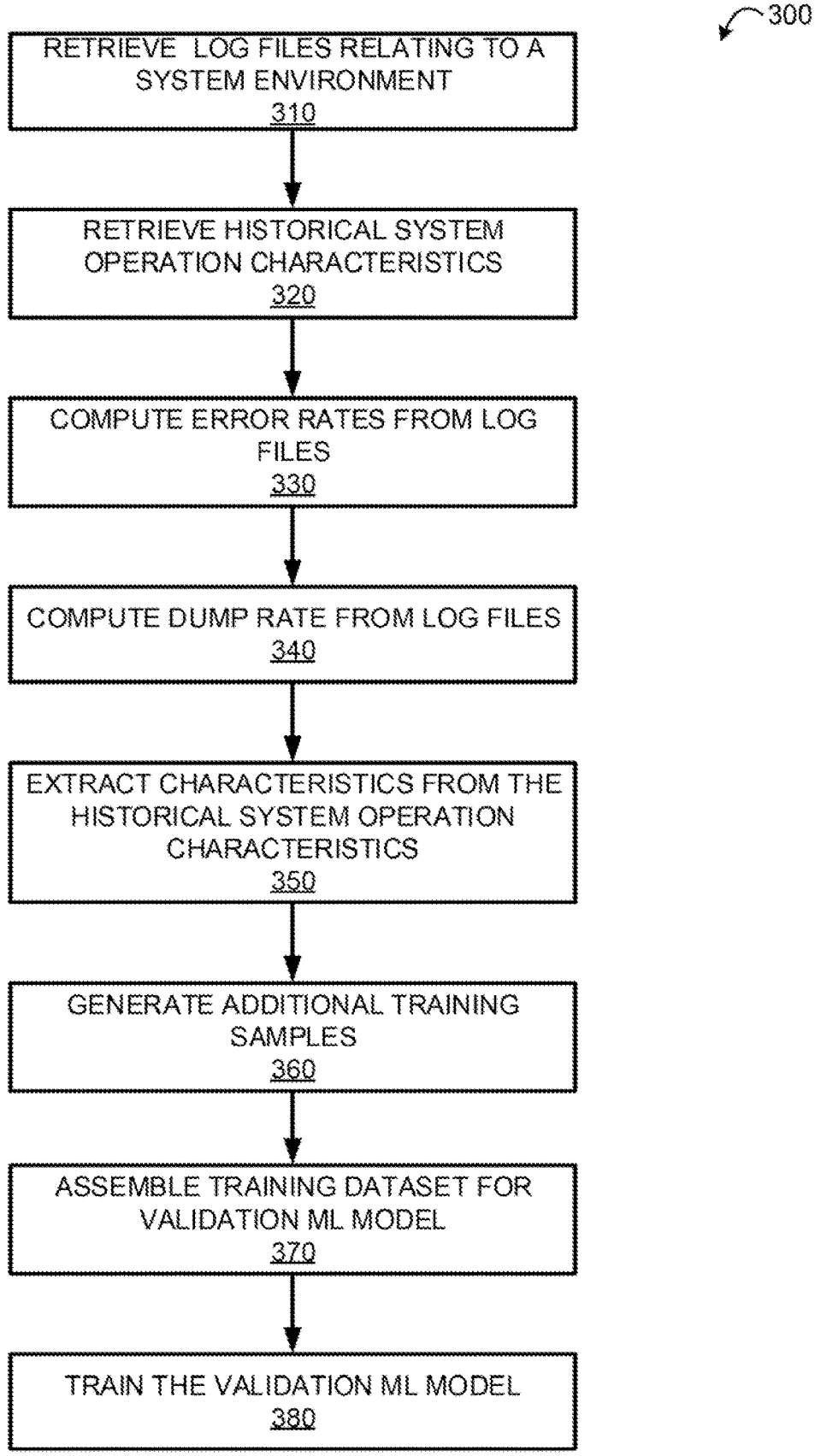
FIG. 3 is a flow diagram illustrating a process of training a validation machine learning model, in accordance with embodiments of the present disclosure.

FIG. 3 is a flow diagram illustrating a process 300 of training the validation machine learning model 160. The process 300 may be performed by hardware, firmware, software executing on a processor, or a combination thereof. For example, any or all the steps of the process 300 may be performed by one or more processors embedded in a computing device The annotation component 120 retrieves log files relating to a system environment and stores them in the system information database 110. This is illustrated at step 310. The log files can include historical implementation log files, historical error log files, and short dump log files from a system environment. The historical implementation log files can include patch implementation information, including information on prior patching decisions, the basis for those decisions, system environment configuration related to the patch, and installation timing. The historical error log files include error information for each patch. For example, the error information can include, but is not limited to, system environment configuration, point of failure, time of failure, error codes, required administrative rights, unauthorized resources, and the like. The short dump log files are log files that record errors generated during runtime of any program triggered by a transaction or extraction.

The annotation component 120 retrieves historical system operation characteristics from the system environment and stores them in the system information database 110. This is illustrated at step 320. The historical system operation characteristics include, but are not limited to, response time, requisition, queue size, table lock, and updated time.

The annotation component 120 computes error rates from the log files. This is illustrated at step 330. The annotation component 120 computes error rates (e.g., per hour, minute, second) from the historical implementation log files. The error rates can be calculated by analyzing the timestamp values characterizing a successful installation of each historical patch retrieved and stored in the system information database 110. The annotation component 120 also computes the error rates (e.g., per hour, minute, second) from the historical system error log files. The error rates can be calculated by analyzing the timestamp values characterizing a successful installation of each historical patch retrieved and stored in the system information database 110.

The annotation component 120 computes the dump rates from the historical short dump log files. This is illustrated at step 340. The dump rates can be calculated by analyzing the timestamp values characterizing a successful installation of each historical patch retrieved and stored in the system information database 110. In some embodiments, the dump rates are computed in the form of a regular expression to find occurrences of the keyword "error". For example, the annotation component 120 can analyze the historical short dump log files and count the log files containing the keyword "error," and compute the error rate based on that count in relation to the total number of historical short dump log files.

The annotation component 120 extracts additional characteristics from the historical system operation characteristics. This is illustrated at step 350. The additional characteristics include, for example, a response time rate, a requisition queue size rate, a table lock average time rate, and an average update time. The annotation component 120 can compute the response time rate, the requisition queue size rate, the table lock average time rate, and the average update time by analyzing the historical system operation characteristics and applying the timestamp value characterizing a successful installation of each historical patch.

The annotation component 120 generates additional training samples for the validation machine learning model 160. This is illustrated at step 360. The annotation component 120 can assemble the validation training dataset 139 by producing a dataset of samples that can include but are not limited to the error rates, the dump rates, the response time rates, the requisition queue size rates, the table lock average time rates, and the update average times. This is illustrated at step 370.

The validation training dataset 139 is specific to the validation machine learning model 160 and trained using the validation training dataset 139. This is illustrated at step 380. In some embodiments, the validation machine learning model 160 employs a regression LSTM neural network to train a model that infers whether the system environment is running an accepted behavior. Training the validation machine learning model 160 also encompasses obtaining hyper parameterization of the LSTM neural network that gauges the model with evaluation metrics. These metrics include, but are not limited to, accuracy, F1-score, precision, and recall.

Figure 4:
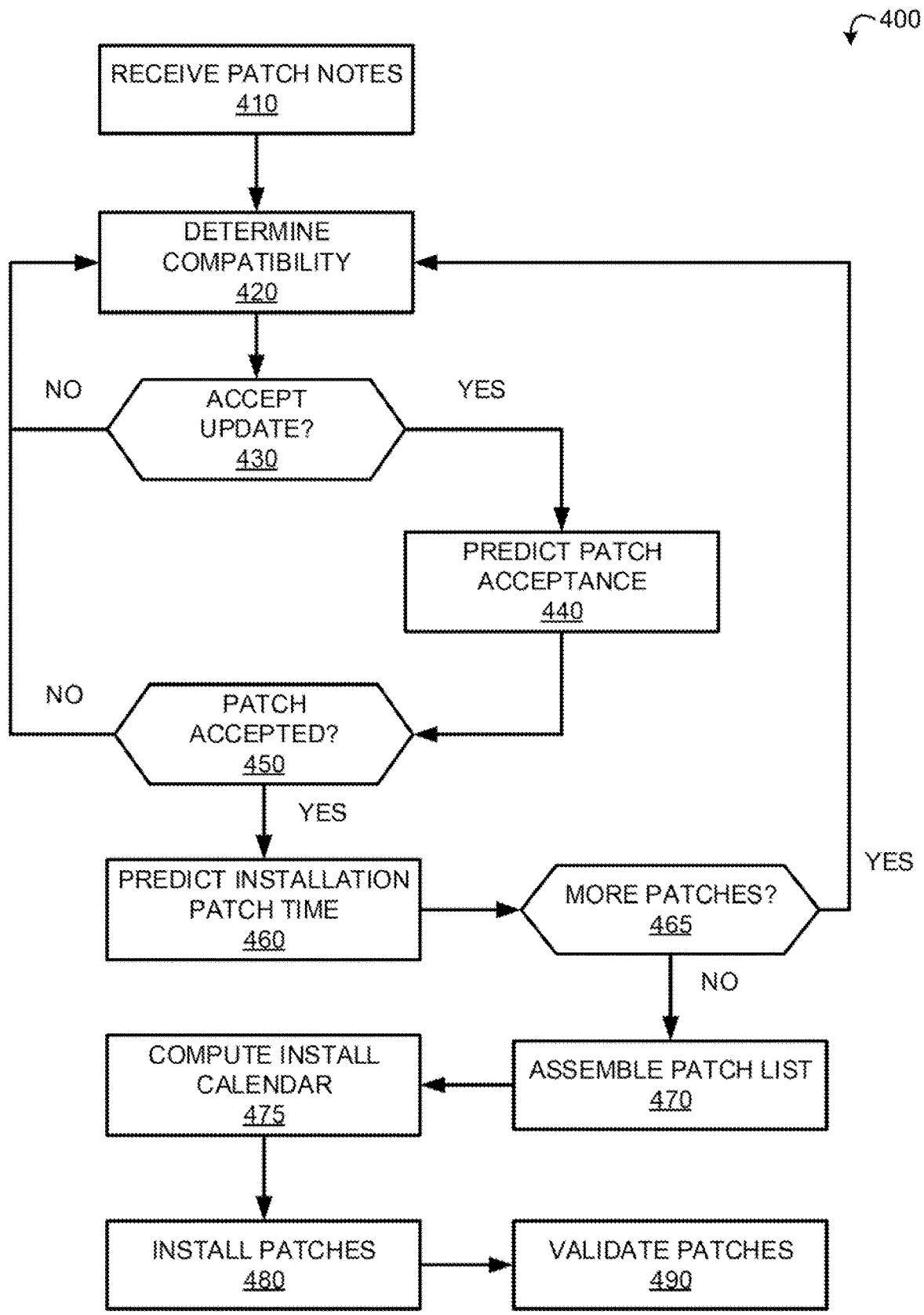
FIG. 4 is a flow diagram illustrating a process of automating security update patches on a system environment, in accordance with embodiments of the present disclosure.

FIG. 4 is a flow diagram illustrating a process 400 of automating security updates on a system environment. The process 400 may be performed by hardware, firmware, software executing on a processor, or a combination thereof. For example, any or all the steps of the process 400 may be performed by one or more processors embedded in a computing device.

The automated security updates system 100 receives patch notes relating to a system environment. This is illustrated at step 410. The patch notes can include a series of patches suggested by a provider that should be installed on the system environment. For example, SAP provides patch notes via their website on a monthly basis. The patch notes also include patch information such as a product name, version and support package, and a CVSS score.

The automated security updates system 100 determines which patches from the patch notes are compatible with the system environment. The determination can be performed by analyzing the patch information such as the product name, version, and support package. In some embodiments, the automated security updates system 100 applies a regular expression to compare the product name, version, and support package of each patch in the patch notes with the product name, version, and support package of the system environment.

A determination is made as to whether a patch is compatible with the system environment. This is illustrated at step 430. If a patch is not compatible, the process 400 returns to step 420 to determine the compatibility of another patch. However, if a patch is compatible with the system environment, the process proceeds to step 440.

The patch acceptance machine learning model 140 analyzes the patch to determine whether the patch can be accepted by the system environment. This is illustrated at step 440. The patch acceptance machine learning model 140 can either output the day of the week and the period of implementation for the patch that signifies that the patch is accepted, or it can output a zero indicating that the patch is not accepted. Initially, the annotation component 120 converts patch and patch information into a sample in a similar fashion as the training sample in the patch acceptance training dataset 133. Once converted, the sample can be inputted into the patch acceptance machine learning model 140 for analysis.

A determination is made as to whether the patch is acceptable to the system environment or not. This is illustrated at step 450. If a patch is not acceptable, the process 400 returns to step 420 to determine the compatibility of another patch. However, if a patch is acceptable with the system environment, the process proceeds to step 460.

The installation machine learning model 150 predicts the overall time necessary to install and implement the patch. This is illustrated at step 460. For example, the installation machine learning model 150 can predict that a patch will take four hours to install and implement onto the system environment. The prediction can be in the form of days, hours, or minutes, depending on how long the installation will occur. Initially, the annotation component 120 converts the patch and patch information into a sample in a similar fashion as the training sample in the installation training dataset 136. Once converted, the sample can be inputted into the installation machine learning model 150 for analysis.

A determination is made as to whether another patch requires analysis by the process 400. This is illustrated at step 465. If another patch requires analysis, the process 400 returns to step 420 to determine the compatibility of another patch. However, if no other patches require analysis, the process proceeds to step 470.

A patch list is assembled from the patches that were accepted and had an installation time computed. This is illustrated at step 470. Using the patch list, the automated security updates system 100 computes an installation calendar for the patches to be installed on the system environment. This is illustrated at step 475. In some embodiments, a genetic algorithm is used on the patch list to obtain an optimized installation calendar. The installation calendar can reflect an intractable search space formed by all possible combinations of installation sequences of the patches in the patch list. In some embodiments, the genetic algorithm considers crossover and selection operators and disregard mutation operators as it is not possible to randomly change the acceptance and installation time of the patches. In some embodiments, a fitness function is used to optimize the list of installation sequences by computing the differences between the latest and earliest patch installation date.

The system environment installs the patches based on the installation calendar assembled by the automated security updates system 100. This is illustrated at step 480. Once the installations are completed, the validation machine learning model validates the installed patches on the system environment. This is illustrated at step 490. Initially, the annotation component 120 converts the installed patches and corresponding log files into samples in a similar fashion as the training samples in the validation training dataset 139. Once converted, the sample can be inputted into the validation machine learning model 160 for analysis. The validation machine learning model 160 can output variables that can be compared to expected values within a predefined threshold. If the variables are within the predefined threshold, then the patches can be considered validated. However, if the patches exceed the predefined threshold, then the patches are not validated.

In some embodiments, if the patches are not validated, the automated security updates system 100 deploys an alert. The alert can signal that the system environment requires human intervention to correct the patch installations. Additionally, the alert can be tied to a specific action plan that may be necessary to address a particular situation type.

Figure 5:
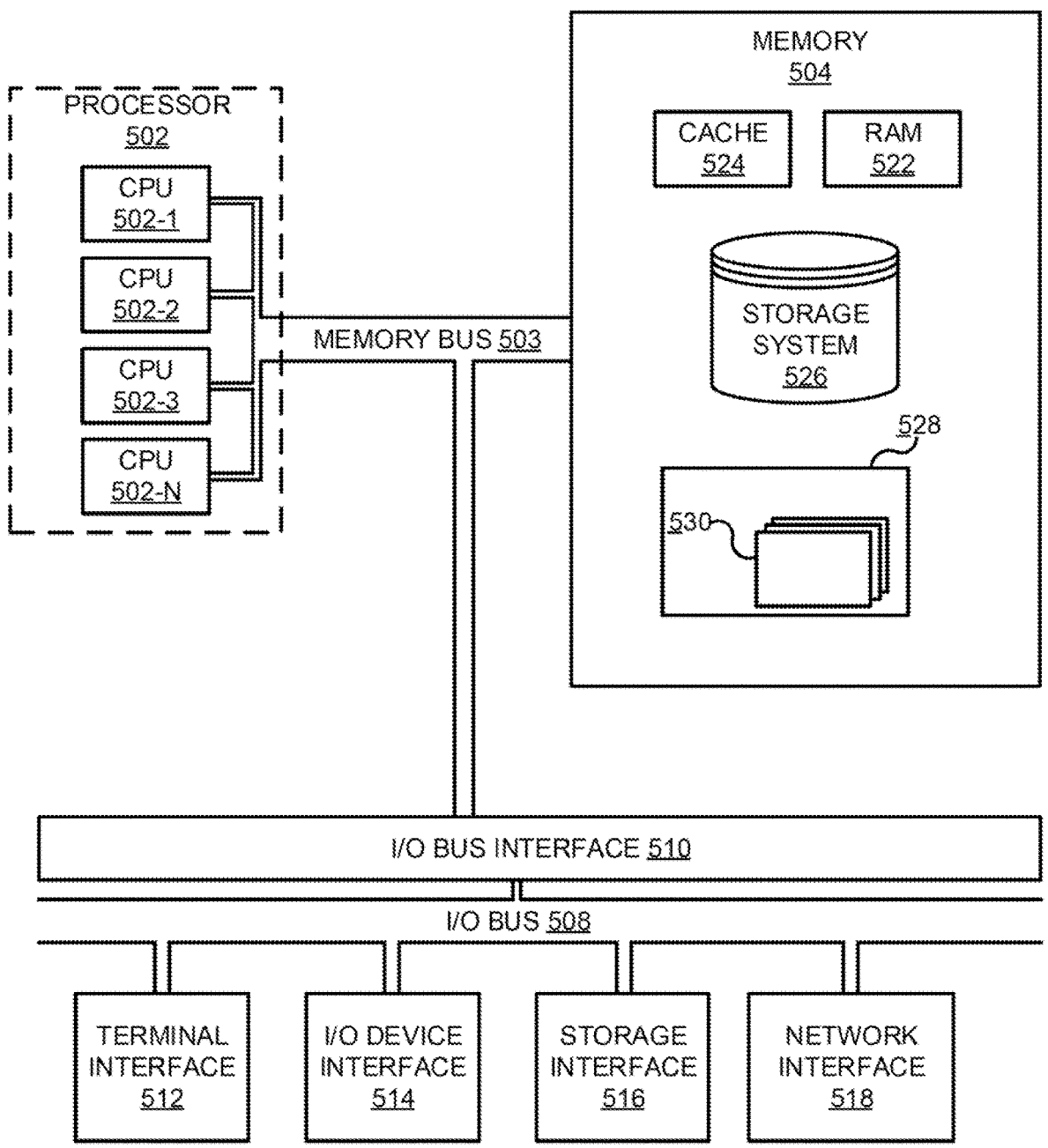
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the automated security updates system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 501 may execute instructions stored in the memory 504 and may include one or more levels of onboard cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the automated security updates system 100), may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
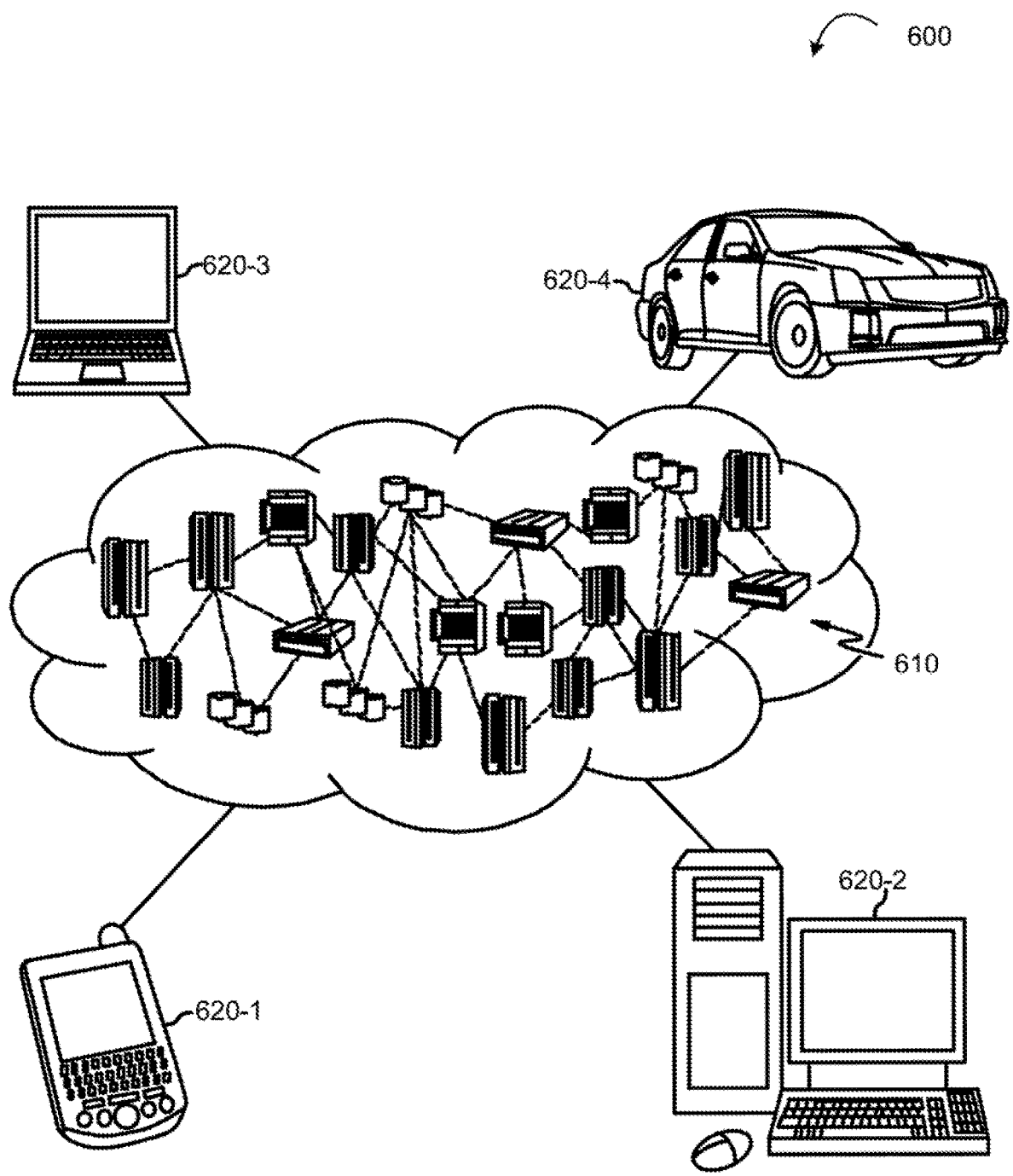
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (P.D.A.) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
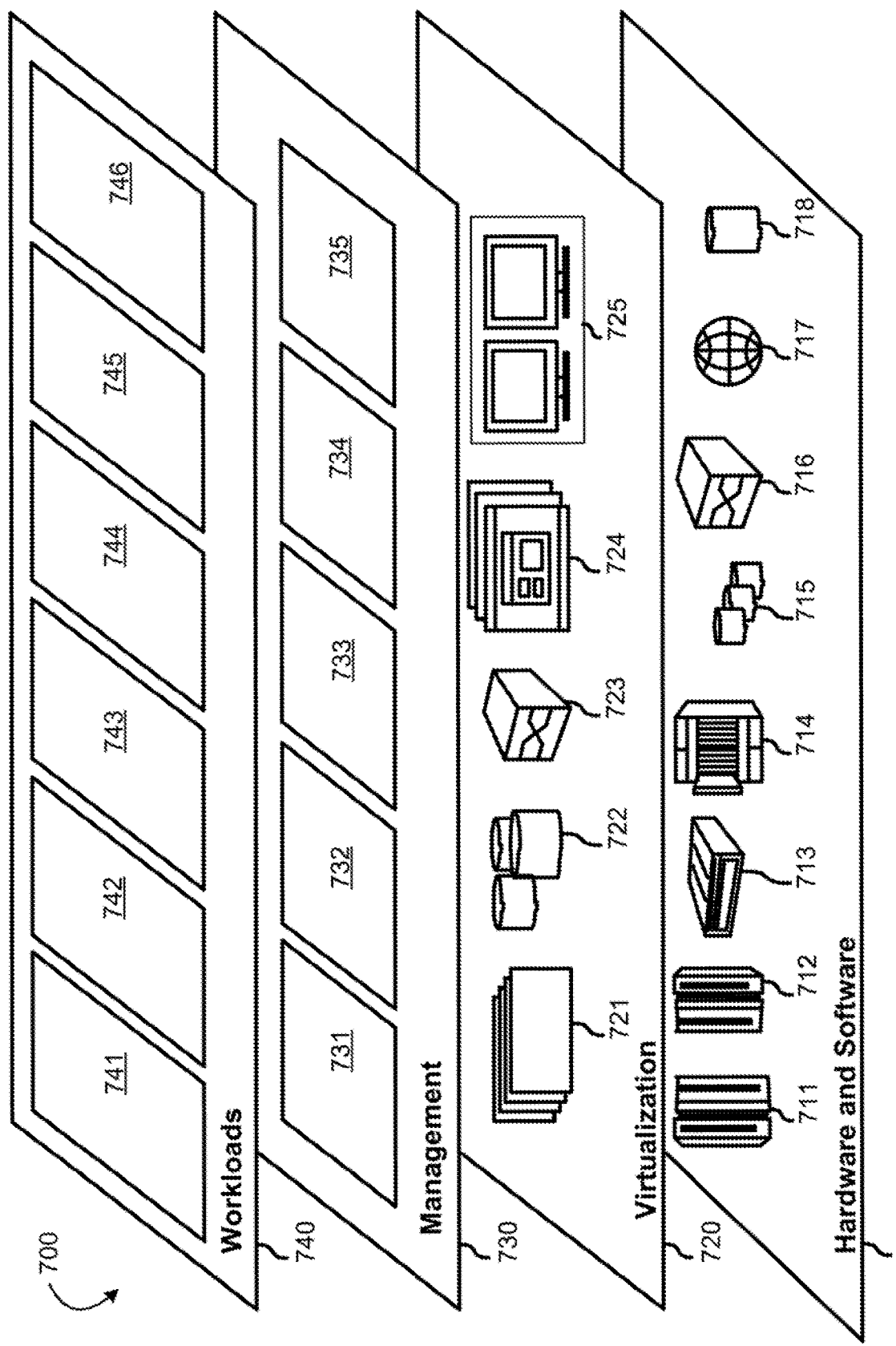
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (S.L.A.) planning and fulfillment 735 provide pre-arrangement for, and procurement of, cloud computing resources for which a future requirement is anticipated in accordance with an S.L.A.

Workloads layer 740 provides examples of functionality for which the cloud computing environment may be utilized. Examples of workloads and functions which may be provided from this layer include mapping and navigation 741; software development and lifecycle management 742 (e.g., automated security updates system 100); virtual classroom education delivery 743; data analytics processing 744; transaction processing 745; and precision cohort analytics 746.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of training machine learning models for automating security updates in a multi-tiered architecture system environment, the computer-implemented method comprising:

retrieving historical patch information relating to a system environment;

extracting descriptive data from the historical patch information, wherein the descriptive data includes unstructured data fields and structured data fields;

extracting installation information from each patch in the historical patch information, the installation information includes a date of installation and a time of installation;

determining an installation duration for each patch in the historical patch information;

generating training samples from the installation information and the installation duration;

assembling training datasets from the training samples for a patch acceptance machine learning model and an installation machine learning model; and training the patch acceptance machine learning model and the installation machine learning model using the training datasets.

2. The computer-implemented method of claim 1, further comprising:

retrieving log files relating to the system environment, wherein the log files include historical implementation log files, historical system error log files, and short dump log files;

retrieving historical system operation characteristics from the system environment;

computing error rates from the historical implementation log files and the historical system error log files;

computing dump rates from the short dump log files;

extracting additional characteristics from the historical system operation characteristics;

generating additional training samples from the error rates, the dump rates, and the additional characteristics;

assembling an additional training dataset from the additional training samples; and training a validation machine learning model, wherein the validation machine learning model is trained to validate patch installations performed on the system environment.

3. The computer-implemented method of claim 2, wherein the additional characteristics include a response time rate, a requisition queue size rate, a table lock average time rate, and an update average time.

4. The computer-implemented method of claim 2, wherein the validation machine learning model is a long short term memory (LSTM) neural network.

5. The computer-implemented method of claim 1, wherein generating the training samples comprises:
  generating a first set of samples for the patch acceptance machine learning model, wherein each sample in the first set of samples include structured and unstructured data from the historical patch information as features;
  generating a second set of samples for the installation machine learning model, wherein each sample in the second set of samples includes an installation time for each of the historical patches as a feature; and
  applying a dimension reduction technique to the structured and the unstructured data to generate a vector representation of the features for each sample in the first set of samples.

6. The computer-implemented method of claim 1, wherein the patch acceptance machine learning model is trained to output a day of a week and a period of implementation for acceptable patches.

7. The computer-implemented method of claim 1, wherein the installation machine learning model is trained to output an installation time period for acceptable patches on the system environment.

8. The computer-implemented method of claim 1, wherein the installation machine learning model and the patch acceptance machine learning model are support-vector machines trained using supervised learning techniques.

9. A computer-implemented method of automating security updates in a system environment, the computer-implemented method comprising:
  receiving a software update note relating to the system environment, wherein the system environment comprises a multi-tiered architecture system environment;
  determining a patch in the software update note is initially compatible with the system environment;
  predicting, by a patch acceptance machine learning model, the patch is acceptable in the system environment;
  predicting, by an installation machine learning model, an installation time period for the patch on the system environment;
  installing the patch during the installation time period on the system environment; and
  validating a patch installation relating to the patch using a validation machine learning model, wherein an annotation component is configured to generate a validation training dataset for the validation machine learning model based on error rates and additional characteristics.

10. The computer-implemented method of claim 9, further comprising:
  determining an unsuccessful patch installation using the validation machine learning model; and
  generating an alert based on the unsuccessful patch installation.

11. The computer-implemented method of claim 9, wherein the validation machine learning model is a long short term memory (LSTM) neural network and/or the installation machine learning model and the patch acceptance machine learning model are support-vector machines trained using supervised learning techniques.

12. The computer-implemented method of claim 9, further comprising:
  receiving a second software update note relating to the multi-tiered architecture;
  determining a plurality of patches in the second software update note are initially compatible in the system environment;
  predicting, by the patch acceptance machine learning model, each patch of the plurality of patches are acceptable in the system environment;
  predict, by the installation machine learning model, installation time periods for each patch of the plurality of the patches on the system environment;
  assembling a patch list based on the acceptable patches and the corresponding installation time periods;
  computing an installation calendar for the system environment based on the patch list;
  installing the plurality of patches on the system environment based on the installation calendar; and
  validating a plurality of patch installations relating to plurality of patches using the validation machine learning model.

13. The computer-implemented method of claim 9, further comprising:
  generating training datasets for the patch acceptance machine learning model, and the installation machine learning model; and
  extracting the additional characteristics from historical system operation characteristics related to the system environment.

14. A system of automating security updates in a multi-tiered architecture system environment, the system comprising:
  a memory;
  a processor;
  local data storage having stored thereon computer executable code;
  a system information database configured to store historical patch information and log files relating to a system environment, wherein the system environment comprises a multi-tiered architecture system environment;
  a patch acceptance machine learning model configured to predict patch compatibility between a patch and the system environment;
  an installation machine learning model configured to predict an installation time period for the patch and the system environment;

a validation machine learning model configured to validate a patch installation performed on the system environment; and an annotation component configured to generate training datasets for the patch acceptance machine learning model, the installation machine learning model, and the validation machine learning model, wherein the annotation component is further configured to generate a validation training dataset for the validation machine learning model based on error rates and additional characteristics.

15. The system of claim 14, wherein the validation machine learning model is a long short term memory (LSTM) neural network.

16. The system of claim 14, wherein the installation machine learning model and the patch acceptance machine learning model are support-vector machines trained using supervised learning techniques.

17. The system of claim 14, further comprising an installation calendar for patches to be installed on the system environment.

18. The system of claim 14, wherein the annotation component is further configured to compute the error rates from the log files stored on the system information database, wherein the error rates include the error rates from historical implementation log files, historical system error log files, and short dump log files.

19. The system of claim 14, wherein the annotation component is further configured to extract the additional characteristics from historical system operation characteristics related to the system environment, wherein the additional characteristics include one or more selected from a group consisting of a response time rate, a queue size rate, a table lock average time rate, and an update average time.

* * * * *